United States Patent
Nieuwenhuizen

(10) Patent No.: US 6,987,542 B2
(45) Date of Patent: Jan. 17, 2006

(54) DETECTION AND CORRECTION OF ASYMMETRIC TRANSIENT SIGNALS

(75) Inventor: Michel Wouter Nieuwenhuizen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 568 days.

(21) Appl. No.: 10/014,193

(22) Filed: Nov. 13, 2001

(65) Prior Publication Data

US 2002/0118303 A1    Aug. 29, 2002

(30) Foreign Application Priority Data

Nov. 13, 2000 (EP) .................................. 00203978

(51) Int. Cl.
H04N 5/21 (2006.01)
H04N 5/213 (2006.01)
H04N 5/217 (2006.01)

(52) U.S. Cl. .............. 348/607; 348/612; 348/618; 348/619; 348/624; 348/627; 382/266; 382/273

(58) Field of Classification Search .............. 348/607, 348/612, 618–621, 623–624, 627, 711; 382/266, 382/273; H04N 5/21, 5/213, 5/217
See application file for complete search history.

(56) References Cited

U.S. PATENT DOCUMENTS

| | | | | |
|---|---|---|---|---|
| 3,919,714 A | * | 11/1975 | Bingham | 348/630 |
| 4,021,848 A | * | 5/1977 | Srivastava et al. | 348/625 |
| 4,041,531 A | * | 8/1977 | Bingham | 348/625 |
| 4,069,505 A | * | 1/1978 | Burdick et al. | 348/625 |
| 4,110,790 A | * | 8/1978 | Wheeler | 348/625 |
| 4,160,276 A | * | 7/1979 | Baker | 348/625 |
| 4,316,210 A | * | 2/1982 | Wharton | 386/9 |
| 4,350,995 A | * | 9/1982 | Harlan | 348/625 |
| 4,386,370 A | * | 5/1983 | Harwood et al. | 348/625 |
| 4,404,584 A | | 9/1983 | Pritchard | |
| 4,414,564 A | * | 11/1983 | Hitchcock | 348/625 |
| 4,646,152 A | | 2/1987 | Eichelberger et al. | |
| 4,689,663 A | * | 8/1987 | Bell et al. | 348/554 |
| 4,888,641 A | * | 12/1989 | Isnardi et al. | 375/240.25 |
| 5,146,319 A | * | 9/1992 | Engel et al. | 348/712 |

(Continued)

FOREIGN PATENT DOCUMENTS

JP    02134911    5/1990

(Continued)

*Primary Examiner*—Brian P. Yenke
(74) *Attorney, Agent, or Firm*—Edward W. Goodman

(57) ABSTRACT

The invention relates to a method and apparatus for detecting asymmetry in transient signals and to a method and apparatus for correcting such asymmetry. In the apparatus for detecting asymmetry there is provided a pre-shoot filter (1) for receiving an input signal Yin and asymmetrically filtering it utilizing a first set of filter coefficients to provide a first output in which substantially only pre-shoots of input transient signals are present, an after-shoot filter (2) for receiving the input signal and symmetrically filtering it utilizing a second set of filter coefficients to provide a second output in which substantially only after-shoots of input transient signals are present, and summing and comparison means (3 to 11) for summing the first outputs over a predetermined time interval, summing the second outputs over the predetermined time interval, and comparing first and second summed outputs to give an output signal indicating whether pre-shoots or after-shoots predominate over the predetermined time interval.

9 Claims, 7 Drawing Sheets

U.S. PATENT DOCUMENTS

| | | | |
|---|---|---|---|
| 5,339,115 A | | 8/1994 | Lagoni |
| 5,414,473 A | * | 5/1995 | Hong ........................ 348/625 |
| 5,430,499 A | * | 7/1995 | Asada et al. ................ 348/628 |
| 5,469,225 A | * | 11/1995 | Hong ........................ 348/625 |
| 5,479,215 A | * | 12/1995 | Chmielewski et al. ...... 348/627 |
| 5,488,576 A | * | 1/1996 | Main ......................... 708/300 |
| 5,920,357 A | * | 7/1999 | Ohara ........................ 348/625 |
| 6,611,296 B1 | * | 8/2003 | Nieuwenhuizen et al. .. 348/625 |
| 6,700,626 B2 | * | 3/2004 | Stessen et al. .............. 348/627 |
| 6,795,588 B1 | * | 9/2004 | Nio et al. ................... 382/261 |

FOREIGN PATENT DOCUMENTS

| | | |
|---|---|---|
| JP | 02230872 | 9/1990 |
| JP | 03245682 | 11/1991 |
| JP | 05316392 | 11/1993 |

* cited by examiner

DETECTION AND CORRECTION OF ASYMMETRIC TRANSIENT SIGNALS

FIELD OF THE INVENTION

The invention relates to transient asymmetry detection and correction of transient asymmetry, particularly, but not exclusively, in video signals.

BACKGROUND OF THE INVENTION

The presence of transients in video signals can give rise to distorted pictures. In practice, it is found that to the human eye, a viewer watching a television will be far less disturbed by transient signals that have symmetrical waveforms, rather than those with asymmetrical wave forms. Asymmetrical transient signals can be caused, for instance, by reflections within coaxial cables, by incorrect transcoding of channels in cable systems and by various other factors.

FIGS. 1A to 1C illustrate symmetrical transient signals. FIG. 1A shows an ideal step response, FIG. 1B a step response with symmetrical overshoots, and FIG. 1C a symmetrical but bandwidth limited step response.

FIGS. 2A and 2B show asymmetrical step responses that are asymmetrically distorted versions of the step responses of the FIGS. 1B and 1C signals. The distortion shown in FIGS. 2A and 2B generally occurs due to transmission errors or problematical signal processing which causes distortion of the symmetrical transients of FIG. 1. FIG. 2B shows an example of a pre-shoot and FIG. 2A an after-shoot. In these Figs., the ideal response is shown dashed (- - -). FIG. 2A shows a response in which the ideal is deviated from to a greater extent upon reaching V2 by over shooting V2 before settling back down. In FIG. 2B, the actual response deviates from the ideal response by dipping below V1 to a relatively large extent prior to the step change between V1 and V2 (this may be regarded as a form of "pre-shoot").

Other types of asymmetrical step responses can be envisaged, and may be caused by e.g. clipping.

U.S. Pat. No. 4,404,584 (RCA) describes an apparatus in which asymmetrical peaking is carried out, but this apparatus does not provide any means for detecting asymmetry in transient signals.

U.S. Pat. No. 5,339,115 (THOMSON) describes a symmetry control circuit with variable delay being imposed on signals according to a selected signal source.

JP-A-02230872 (MAKOTO MIYAHARA) discloses a phase distortion correction in image pickup tubes in which correction is achieved by distorting the input signal with an inverse characteristic.

SUMMARY OF THE INVENTION

It is an object of the present invention to provide both method and apparatus for the measurement of transient asymmetry distortion (TAD). It is a further object of the present invention to provide a method and apparatus for reducing transient asymmetry distortion. It is a still further object of the present invention is to provide a method and apparatus for the combined measurement and reduction of transient asymmetry distortion.

The invention provides methods and devices for detecting and/or correcting asymmetry, and a display apparatus comprising such a device, as defined in the independent claims. The dependent claims define advantageous embodiments.

These and other aspects of the invention will be apparent from and elucidated with reference to the embodiments described hereinafter.

BRIEF DESCRIPTION OF THE DRAWINGS

For a better understanding of the invention, and to show how embodiments of the same may be carried into effect, reference will now be made, by way of example, to the accompanying diagrammatic drawings in which.

DESCRIPTION OF PREFERRED EMBODIMENTS

Artificial asymmetry in video signals can be detected by the human eye if it is large enough. In most current television signals, this asymmetry is below the threshold detection level of the human eye. However, due to transmission errors and the enhanced levels of internal processing which occur in modern televisions, these asymmetrical effects can exceed the threshold value of the human eye and become noticeable.

Figure 1A:
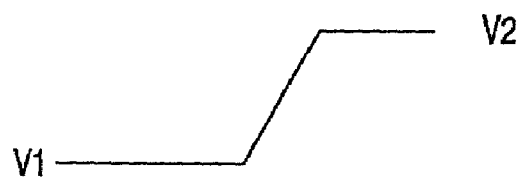
FIGS. 1A to 1C show symmetrical transient responses.
Figure 1B:
Figure 1C:
Figure 2A:
FIGS. 2A and 2B show asymmetrical transient responses.
Figure 2B:

In order to aid the detection of transient asymmetrical distortion in video signals, it is necessary to be able to recognize both "pre-shoots" (for instance as occurs in the FIG. 2B example) and "after-shoots" (as occurs in the FIG. 2A example).

One method of doing this is to provide a means for providing a qualitative measure to assess the relative amounts of pre-shoots and after-shoots in a video signal using FIR (finite impulse response) filters and make a comparison of the sum of their absolute values. For standard definition video signals, a 9-tap FIR filter for providing a measure of the presence of pre-shoots may be provided with the following coefficients:

$$\text{FIRfilter}_{early} = [4, 0, -1, 0, -1, 0, -1, 0, -1] \quad (1)$$

An appropriate filter for quantifying the after-shoots for standard definition video signals may be found by applying the following coefficients:

$$\text{FIRfilter}_{late} = [-1, 0, -1, 0, -1, 0, -1, 0, 4] \quad (2)$$

These filter coefficients were chosen on the following basis. Firstly, the frequency response of the filters should match the bandwidth of the video signal of interest to avoid introducing distortion. Secondly, the impulse responses of the $\text{FIRfilter}_{early}$ and the $\text{FIRfilter}_{late}$ should be as asymmetrical as possible while equally emphasizing the pre-shoot and after-shoot components respectively. This second requirement is achieved by choosing the filter coefficients to be anti-symmetrical to one another and that each filter's coefficients sum to zero to various combinations of filter coefficients are possible, the most suitable of which could be determined by basic experimentation in a given application of the invention.

For symmetrical signals, the correlation between the response of these filters will be large, and for asymmetrical signals, the correlation will be small. Indeed, with an ideal picture both FIRfilter$_{early}$ and FIRfilter$_{late}$ match equally well. By summing of the absolute values of the responses for each filter over the relevant areas of a field or frame, the characteristics of the transients in question and a measure of the amount of distortion can be gathered.

The sum of the absolute values of the response for the pre-shoot filter within a particular window may be represented by equation (3):

$$\text{early} = \sum_{window} \text{abs}(FIRfilter_{early}) \quad (3)$$

The sum of the absolute values of the response for the after-shoot filter within a particular window may be represented by equation (4):

$$\text{late} = \sum_{window} \text{abs}(FIRfilter_{late}) \quad (4)$$

To give an indication of the asymmetry of the transient signals therefore, we take the difference between early and late and apply scaling with early plus late to give a measure which is independent of the amount and size of the transients as represented by equation (5):

$$\text{transient\_asymmetry} = \frac{\text{early} - \text{late}}{\text{early} + \text{late}} \quad (5)$$

If transient asymmetry is greater than 0 then pre-shoots dominate and if transient-asymmetry is less than 0, after-shoots dominate.

Figure 3:
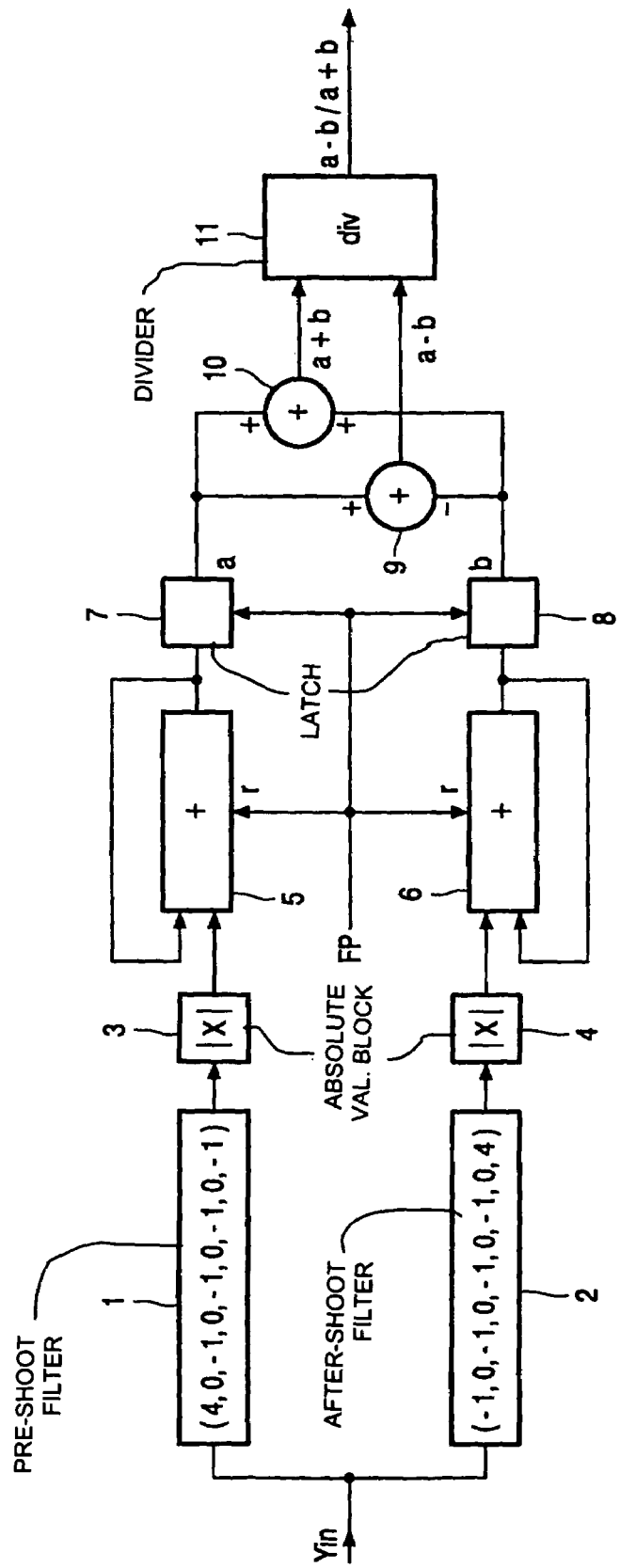
FIG. 3 is a schematic diagram illustrating means and method for the measurement and detection of asymmetrical transient distortion.

Referring now to FIG. 3, there is shown a block diagram showing functional elements for implementing the above formulae, such functional elements comprising pre-shoot and after-shoot filtering and summing and comparison means. In FIG. 3 there is shown a pre-shoot filter 1, an after-shoot filter 2, a first absolute value block 3, a second absolute value block 4, a first summing block 5, a second summing block 6, a first latch 7, a second latch 8, a subtracter 9, an adder 10 and a divider 11 that supplies an asymmetry detection output signal.

Inputs of the pre-shoot filter 1 and the after-shoot filter 2 receive an input signal Yin and provide appropriately filtered outputs to respective first and second absolute value blocks 3, 4. The output of first absolute value block 3 is fed to one input of the first summing block 5, and the output from the first summing block 5 is fed back to a second input of the first summing block 5 for combining with a freshly preshoot filtered absolute valued signal output from the first absolute value block 3 so as to sequentially sum the absolute values of all of the pre-shoot filtered signals over a predetermined time interval, in this case the period of one field. When a field pulse FP occurs, the result of the summing operation performed by the first summing block 5 is latched by the first latch 8 whose input is connected to the output of the first summing block 5 and a first input of the adder 10 so as to output the summed result to a positive input terminal of the subtracter 9. At the same time, the field pulse FP resets the first summing block 5 (reset input r) so that it is ready to perform a new summing operation during the next field.

Referring now to the after-shoot filter 2, second absolute value block 4, second summing block 6 and second latch 8, it can be seen that these elements work in similar fashion to the pre-shoot filter 1, first absolute value block 3, first summing block 5 and first latch 7 described above. In other words, the after-shoot filter 2 receives the input signal Yin and filters it. The after-shoot filtered signal is output from after-shoot filter 2 to the absolute value block 4, whose output is thereafter input to a first input terminal of the second summing block 6. The second summing block 6 has an output which is fed back to a second input terminal so that over the period of one field, the values sequentially output from the second absolute value block 4 are summed together. Following one field period, a field pulse FP is issued which triggers second latch 8 (which is connected to the output of second summing block 6) to output the summed result to a negative input terminal of the subtracter 9 and to a second input of the adder 10, the same field pulse being also used to reset the second summing block 6 (and the first summing block 5 and first latch 7 as previously described).

As described, the outputs from the first and second latches 7, 8 are fed to input terminals of the subtracter 9 and adder 10. The output from the first latch 7 is fed to the positive input terminal of the subtracter 9 and to the first input terminal of the adder 10, whilst the output from the second latch 8 is output to the negative input terminal of the subtracter 9 and to the second input of the adder 10. The output of the subtracter 10 is the result of the subtraction of the output of the second latch 8 from the first latch 7 and the output of the adder 10 is the result of the addition of the outputs of the first latch 7 and second latch 8.

Outputs from the subtracter 9 and the adder 10 are input to a divider 11 which divides the output of the subtracter 9, by the output of the adder 10. In this way, the output of the divider 11 fulfils the result of equation (5) and provides an indication of the amount of transient asymmetric distortion.

Figure 4:
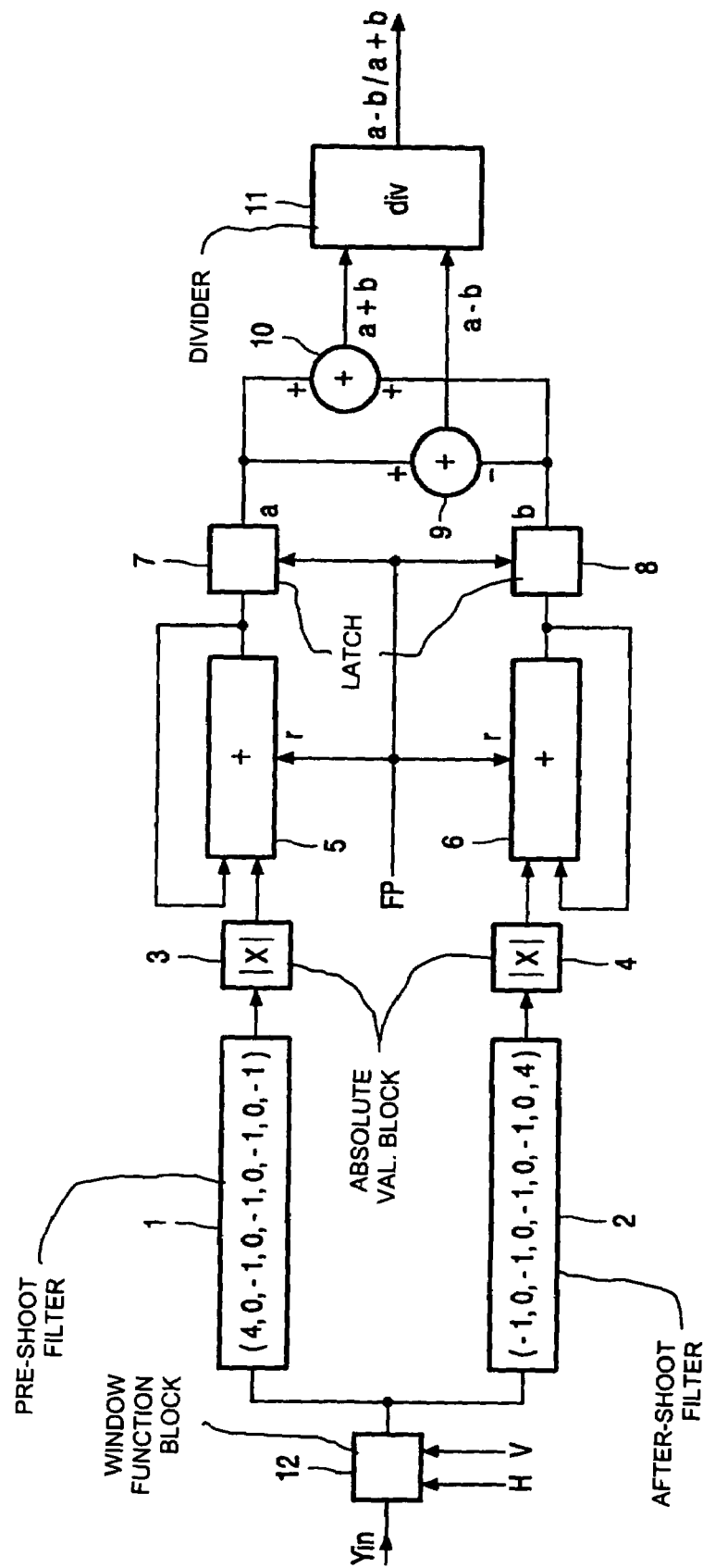
FIG. 4 is a schematic diagram similar to FIG. 3, but including a windowing function.

Referring now to FIG. 4, there is shown a block diagram that is identical to the FIG. 3 schematic except that it further includes a window function block 12. The windowing function block 12 is positioned upstream of the elements described in relation to FIG. 3 so as to receive the input signal Yin and window that signal in horizontal and vertical directions prior to providing an output to the pre-shoot filter 1 and the after-shoot filter 2. The windowing function block 12 is preferably included so as to avoid edge effects and effects of rims. Further, if the function is only carried out over a certain window then such functions will take less time to implement and require less processing power.

Figure 5:
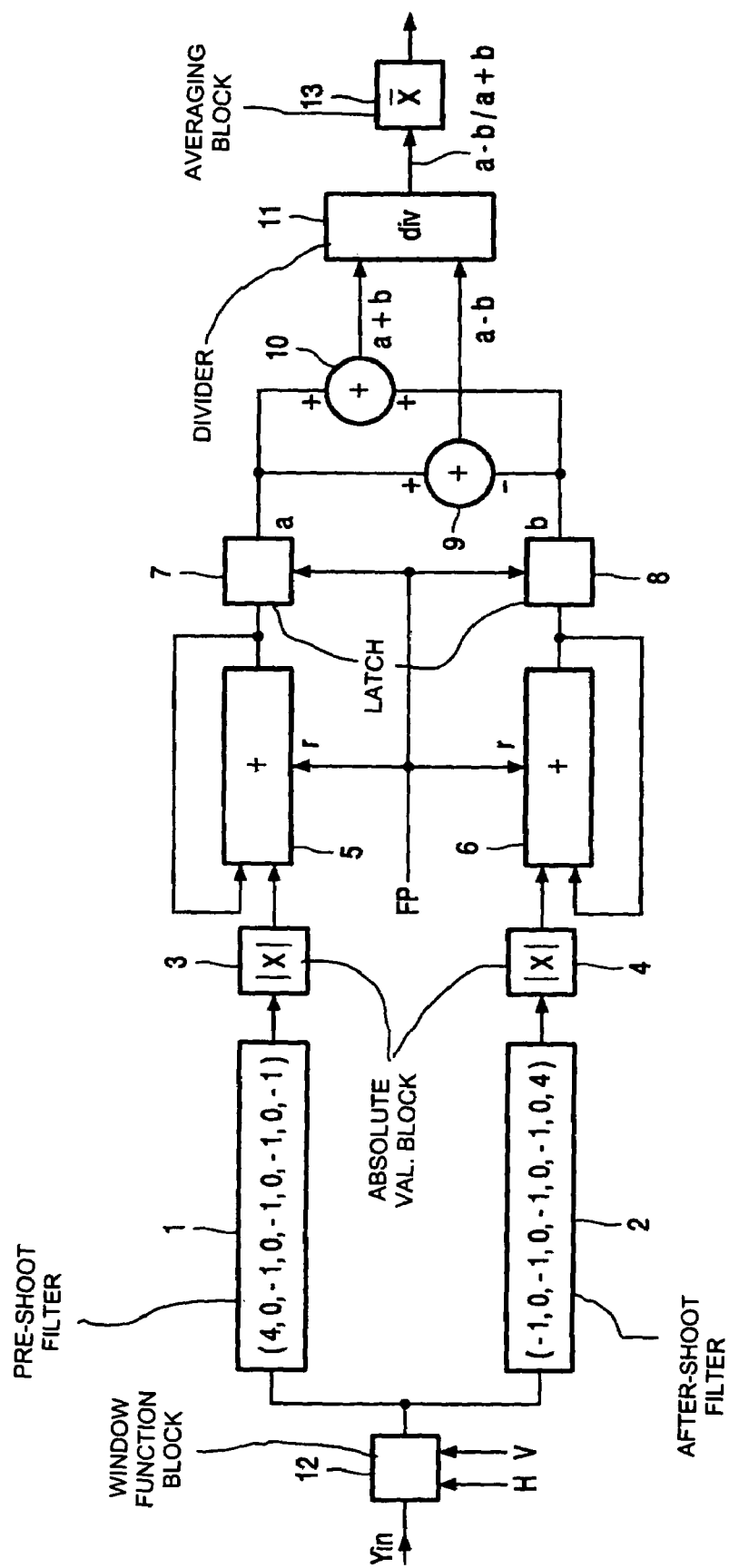
FIG. 5 is a schematic diagram similar to FIG. 3, but including an averaging function.

Referring now to FIG. 5, there is shown a variation on the block diagrams of the FIGS. 3 and 4 embodiments. In FIG. 5, in addition to the functional blocks of the FIG. 4 embodiment there is further provided an averaging block 13 positioned at the output of divider 11. By including such an averaging function, field-to-field variations effects which might otherwise persist can be advantageously reduced or removed.

It will be evident to the man skilled in the art that the functional blocks as shown in FIGS. 3 to 5 may be implemented either in hardware or software. In hardware implementations, it is desirable to reduce memory requirements to a minimum and in this respect, the two 9-tap FIR filters constituting the pre-shoot and after-shoot filters may share the use of a memory block.

From the above, it will be evident that there has been described a method for indicating the total amount of transient asymmetric distortion. Once there is an indication of the amount of distortion, there is then required a method and means for removing or correcting to a certain extent this distortion. Such method and means will now be described.

One method of correction would be to utilize a peaking circuit and a second way of performing correction would be to utilize a group delay equalizer.

Figure 6:
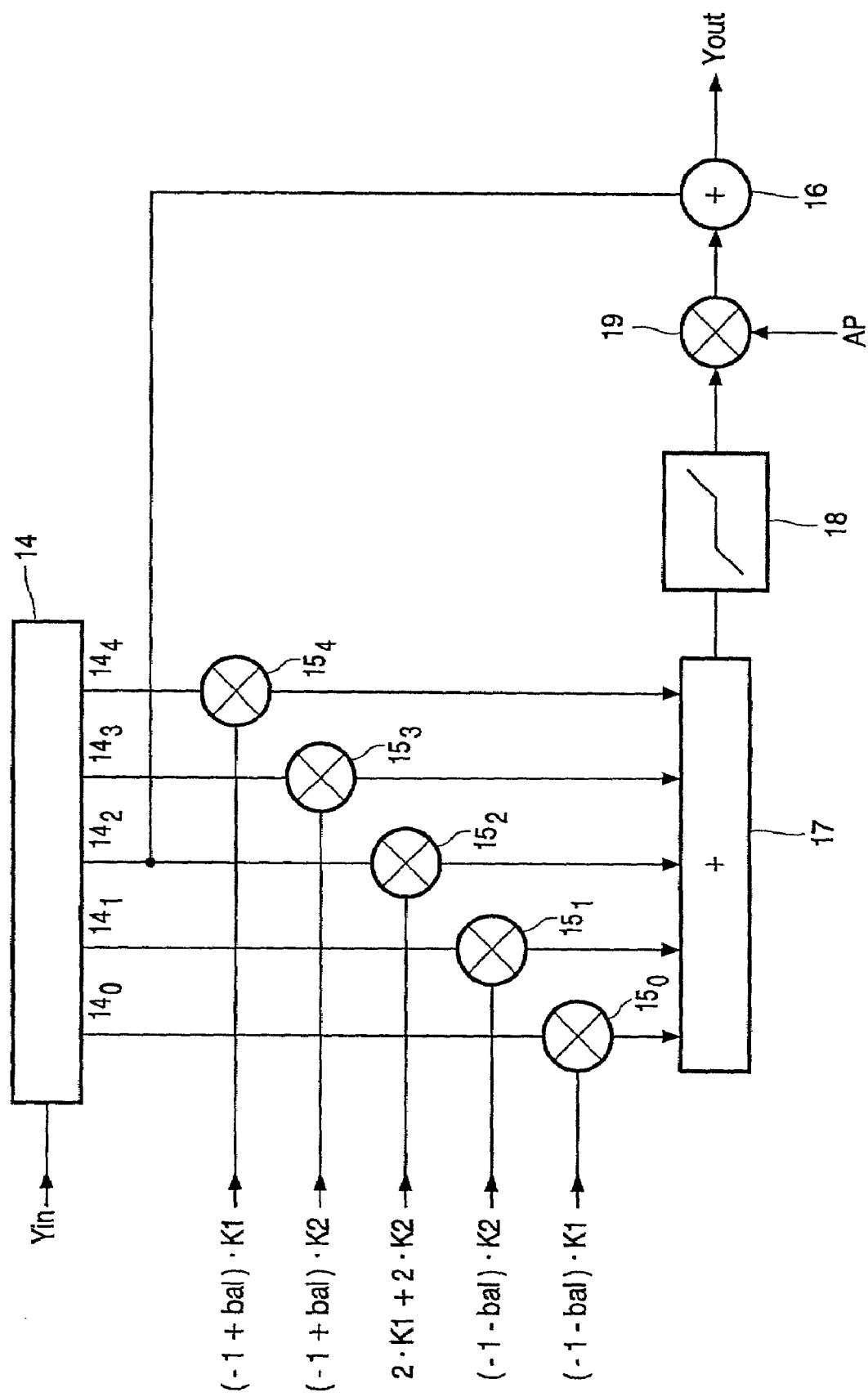
FIG. 6 is a schematic block diagram showing an asymmetrical peaking filter for the reduction of transient asymmetrical distortion.

Referring now to FIG. 6, there is shown an asymmetrical peaking circuit. Peaking circuits are present in most televisions. If an existing symmetrical peaking filter of a peaking circuit can be combined or modified to cooperate with an asymmetry detector as described above, then correction may be possible in a relatively economical fashion by effectively adding pre-shoots where after-shoots are found to predominate and adding after-shoots where pre-shoots predominate. The peaking algorithm needs to be optimized so that it can fulfil both the usual demands of sharpness enhancement as well as the new function of asymmetrical correction.

In FIG. 6, an asymmetrical peaking circuit is shown comprising a delay line 14 having a number of outputs $14_0$, $14_1$, $14_2$, $14_3$, $14_4$. Each output from the delay line is fed to a first input of a respective multiplier $15_0$–$15_4$. A second input of each multiplier $15_0$–$15_4$ is fed with the following respective multiplying factors:

(−1−bal)*k1; (−1−bal)*k2; 2*k1+2*k2; (−1+bal)*k2; (−1+bal)*k1.

The variables "k1" and "k2" are filter constants, which are chosen in accordance with the desired characteristics of the peaking circuit itself and typically lie in the range 1 to 4. The variable "bal" (balance) is derived from the output of the transient asymmetry detector and indicates the amount of restoring asymmetry to be added. Typically, "bal" lies in the range −2 to 2.

The middle output $14_2$ from the delay line 14 is further fed to a first input of an adder 16. Outputs from the multipliers $15_0$–$15_4$ are input to a summing circuit 17. The output of the summing circuit 17 is fed to a coring circuit 18 and the output of this is fed to a further multiplier 19, which acts as an attenuating means. The output from the coring circuit 18 is multiplied by a factor AP (amount of peaking) and the output of multiplier 19 is fed to a second input of the adder 16 for adding to the output of the mid-point of the delay line 14 ($14_2$) to provide an output Yout.

To explain the operation of the FIG. 6 circuitry in more detail, the major components of the circuit of FIG. 6 represent a more or less standard peaking circuit as used in most television sets. The delay line 14, multipliers $15_0$ to $15_4$ and summing circuit 17 form a peaking filter. The variation in the FIG. 6 peaking filter concerns the addition of the balance parameter bal, which forces the normally symmetrical impulse response of the circuit to become asymmetrical in response to variation in balance. In this example the value of balance may be set according to the symmetry characteristics found by the detector circuitry of FIG. 5. For instance, if the detector of FIG. 5 has determined the input signal to be symmetrical then the balance parameter bal is set to be zero. On the other hand, the balance parameter bal may be set to a positive value (1) if after-shoots were detected and to a negative value (−1) if pre-shoots were detected.

The circuit of FIG. 6 will, by varying its characteristics according to the value of the balance parameter bal, as explained above, tend to make the transient more symmetrical by changing its impulse response. The alteration in impulse response of the peaking circuit as described is achieved by making the circuit a programmable FIR filter, via $15_0$. $15_4$, FIR filter.

Figure 8:
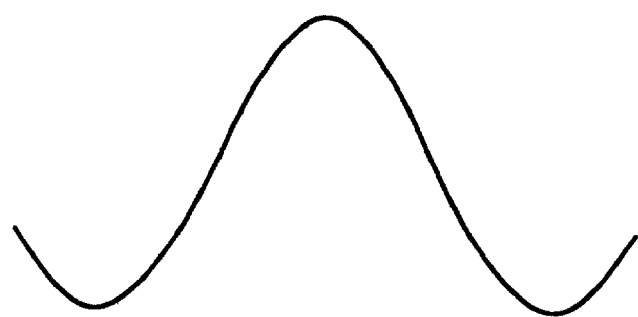
FIGS. 8 to 10 illustrate in a qualitative fashion the transient responses of a summer component 17 of the FIG. 6 filter in the cases where a value "balance" is zero, a maximum value and a minimum value respectively.
Figure 9:
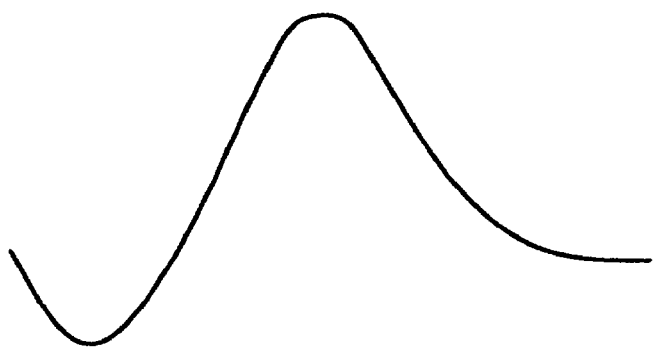
Figure 10:
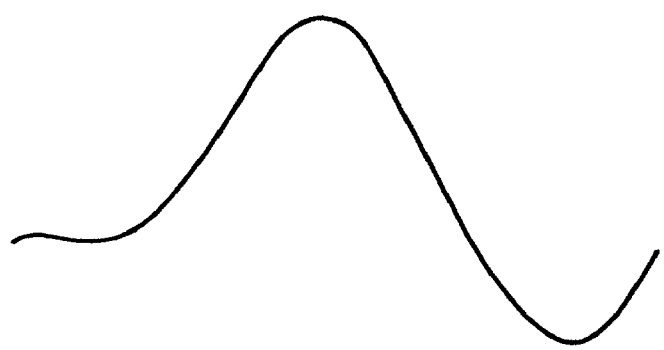

A typical transient response at the output of summer 17 is shown in illustrative form in FIG. 8. This response is used for symmetrical transients and for such cases the balance parameter bal=0. If bal deviates from 0, the filter becomes progressively asymmetrical with a pure asymmetrical filter at bal becoming 1 (see FIG. 9) to effectively add an after-shoot, which tends to equalize a detected pre-shoot, or when balance becomes −1 (see FIG. 10) to effectively add a pre-shoot, which tends to equalize a detected pre-shoot. If this signal (at the output of summer 17) is added to the signal at 16, pre- and after-shoots are created in the signal. Due to the asymmetry at the balance parameter bal being unequal to 0, there will be either smaller or larger pre- than after-shoots in the output signal from summer 17. Coring circuit 18 reduces the peaking effect for small transients, hence avoiding worsening of the S/N ratio of the signal. Multiplier 19 regulates how much of the filtered signal is added to the main signal by adder 16, thus controlling the amount of peaking applied to the signal.

From the discussion concerning the detecting part of the circuitry, it will be evident that the detector provides a qualitative indication concerning the relative amounts of pre-shoots/after-shoots. Therefore, because this is a qualitative measure and no direct measurement value is obtained, a feedforward measurement/correction system is not possible and instead a feedback loop must be adopted.

Figure 7:
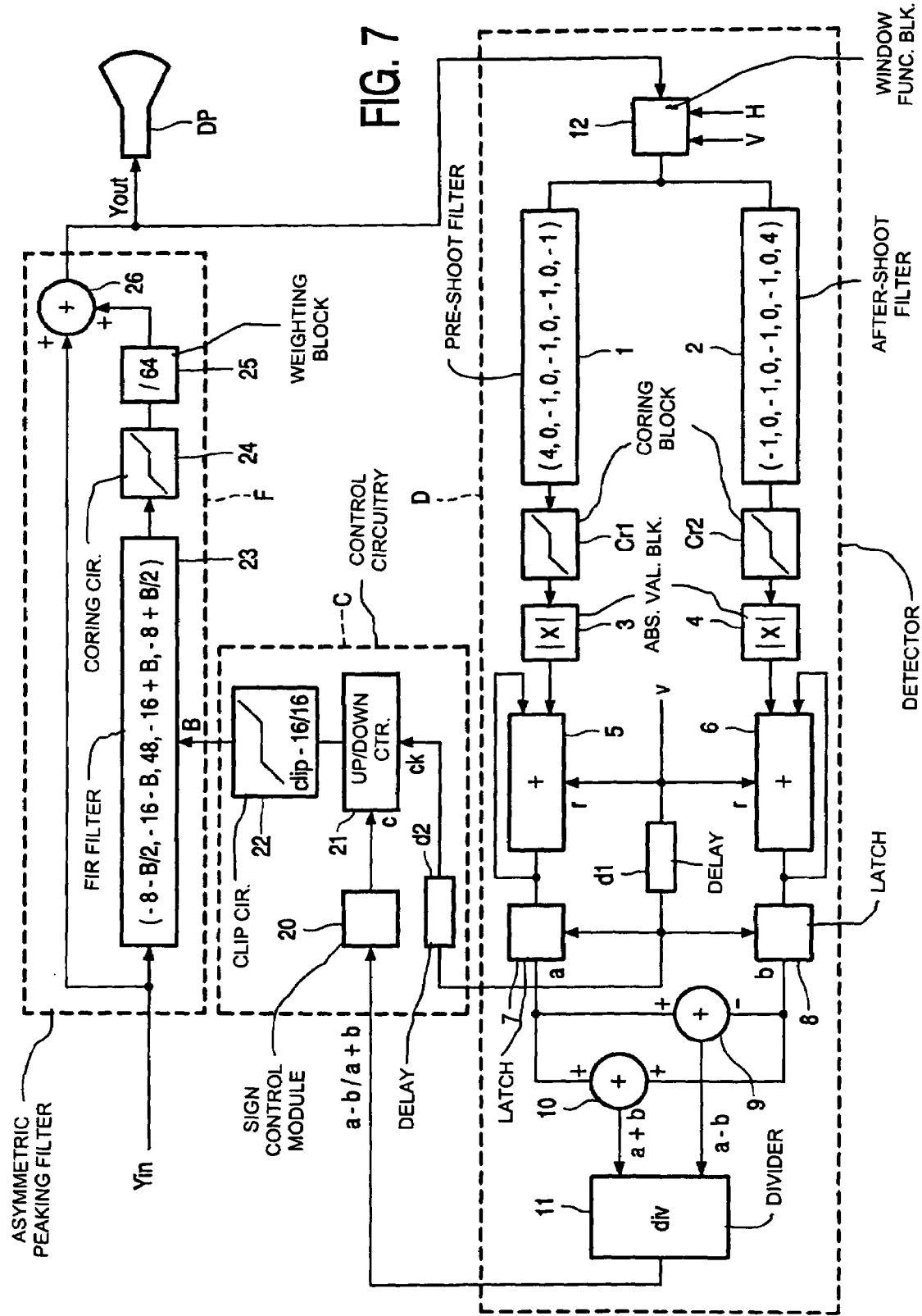
FIG. 7 is a schematic block diagram showing a combined system for the detection and compensation of transient asymmetrical distortion.

Referring now to FIG. 7, there is shown an asymmetric control system for both the detection and correction of asymmetric distortion. Referring to FIG. 7, there is shown in general functional terms detector circuitry D, control circuitry C and an asymmetric peaking filter F. The detector circuitry D is generally in accordance with the circuitry already described in relation to FIG. 4. The same reference numerals are used in FIG. 7 to denote the same components shown in FIG. 4 and the function and inter-relation of these detector circuitry components and as need not be described further. The only differences between the detector circuitry D and the FIG. 4 circuitry is the addition of coring blocks $Cr_1$ and $Cr_2$ and a first delay d1. The first and second coring blocks $Cr_1$, $Cr_2$, are positioned respectively between the output of pre-shoot filter 1 and input of first absolute value block 3, and between the output of after-shoot filter 2 and input of second absolute value block 4. Here, the coring circuits suppress very small transients that are not part of the video but could occur due to noise. The first delay d1 is arranged to delay the arrival of the field pulse V at the latching input of the first and second latches 7, 8 with respect to the resetting time of the first and second summing blocks 5, 6 to ensure proper synchronization of signals so that the correct summed results are passed to the subtracter 9 and adder 10.

The control circuitry C comprises a sign control module 20 which receives an output of the detector D. The sign control 20 module provides an output to a control input c of an up/down counter 21, which has a clocking input ck and which has an output which feeds to a clipping circuit 22. The clock signal fed to the counter 21 is a further delayed version of the field pulse already delayed by delay d1. The further delay in the field pulse introduced by delay element d2 is arranged so as to compensate for the transition times from the output of the first and second latches 7, 8 through to the appropriate up/down instructions being delivered from the sign control module 20, i.e. this delay represents the transmission delay imposed upon the output signals from the first and second latches 7, 8 by the subtracter 9, adder 10, divider 11 and sign block module 20 so as to ensure proper synchronization of signals at the counter 21.

In the particular example of FIG. 7, the clipping circuit 22 is set so as to output a signal having a maximum count value of 16 or a minimum count value of −16, with the direction of counting of the up/down counter 22 being controlled by the sign block 21 in accordance with the qualitative measure of pre-shoot/after-shoot bias fed to it by the detector D.

The asymmetric peaking filter F comprises an FIR filter 23 with variable coefficients, coring circuit 24, a weighting block 25 and an adder 26. The FIR filter 23 has variable parameters set by the balance factor B input to it by the clipping circuit 22, the coefficients of the exemplary filter 23 being: −8−B/2; −16−B; 48; −16+B; −8+B/2.

The combined system for the detection and compensation of transient asymmetrical distortion as shown in FIG. 7 operates as follows. Firstly, the feedback loop comprising detector circuitry D and control circuitry C will be described.

A signal input to the detector circuitry D is processed in accordance with the steps described in relation to FIG. 4 so as to provide a detector circuit output in accordance with equation (5), so that a control value transient_asymmetry is input to control circuitry C. The value transient_asymmetry, if greater than zero indicates that pre-shoots dominate and, if less than zero, indicates that after-shoots dominate. This positive or negative value is therefore input to sign control module 20. This control module 20 detects whether or not there is a positive or negative input and provides an up-count or down-count signal respectively to the up/down counter 21. As a new calculation is prepared by the detector circuitry D with each field pulse, the control circuitry C is also set to either increment or decrement the up/down counter 21 every field pulse in accordance with the delayed field pulse signal input to clocking input ck. For instance, supposing that the up/down counter output commences at zero, then the output of clipping circuit 22, and represented by value B is also zero. In this case, the coefficients of the FIR filter 23 are: 31 8, −16, 48, −16, −8 and neither pre-shoots nor after-shoots are found to dominate. Next, let us assume that the detector provides an output which indicates that pre-shoots dominate. In this case, the input to the sign control module 20 will now change to a negative value and the sign value module 20 will provide an output to the up/down counter 21 indicating that a down count should be performed so that, at the reception of the next clocking pulse Ck, the value B is decremented to thereby alter the coefficients of the FIR filter 23 so as to create after-shoots. If pre-shoots continue to dominate, then in due course the up/down counter 21 will continue counting downwardly up to a maximum negative limit determined by the clipping circuit 22, at which extreme point "B" will be −16 and the coefficients of the FIR filter 23 will then be 0, 0, 48, −32, −16.

In contrast, if after-shoots predominate then the input to sign value module 20 will be positive, indicating that an up count should take place at the up/down counter 21 and pre-shoots will effectively be added. In the most extreme cases where after-shoots continue to predominate, the maximum amount of compensation offered by the FIR filter 23 will be in the case where B=16 and, therefore, the coefficients of that filter will then become −16, −32, 48, 0, 0.

Considering now the asymmetric peaking filter circuitry F in more detail, it can be seen that this circuitry basically provides an adaptive filter, the parameters of which are controlled by the feedback loop comprising D and C. This adaptive FIR filter 23 receives an input signal Yin and outputs the adaptively filtered value to coring circuit 24. The coring circuit 24 then provides an output to a scaling factor representing division by a factor of 64. This division carried out by the weighting block 25 is then output to an adder 26 that further receives the full input signal Yin. Since the center tap of the filter has coefficient 48, the maximum peaking correction applied here amounts to 48/64×Yin=0.75Yin. In this manner, high frequencies are added up to a maximum 0.75 of Yin, which corresponds with approximately 4 dB.

In the above discussion of FIGS. 6 and 7, one approach was described in which the signal from an asymmetry detector may be used in order to provide asymmetry correction utilizing a peaking circuit. An alternative to such a circuit would be to use the detector signal to control the operation of a group delay equalizer. As is well known, transient signals may be split into low and high frequency component parts. If the transient is symmetrical, then both low and high frequencies will have the "center" of their respective transients coincident in time. However, if the original transient is asymmetrical, there will be a time difference between the center of the low frequency and high frequency transients. For transient signals with pre-shoots, the center of the high frequency component occurs prior to the center of the low frequency components, whereas for signals with after-shoots the opposite applies. This property may be utilized to correct asymmetrical transients by time shifting the high frequencies with respect to the low frequencies using a group delay equalizer, which is a filter that does not change the amplitude of a signal but only it's phase. Therefore, by varying the delays (or filter settings) within the group delay equalizer, high frequencies can be delayed to a greater or lesser extent than the low frequencies to correct the asymmetry. Therefore, to correct pre-shoots high frequency components are delayed to make their center coincide with the center of the low frequency components, whereas to correct after-shoots, the low frequency components are delayed to make their center coincide with the center of the high frequency components. In this way, rather than adding pre-shoots to equalize after-shoots or adding after-shoots to equalize pre-shoots, a solution to the problem of correcting asymmetry itself may be achieved by including such time shifting apparatus within a feedback loop instead of the peaking circuitry described in relation to FIG. 7.

If neither pre-shoots nor after-shoots are found to predominate then both pre-shoots and after-shoots may be added in equal amounts.

As will be understood from the above, the present invention provides a convenient means of detecting asymmetry in transient signals and, where such asymmetry is systematic, providing correction. Wherever hardware components have been discussed in the above description, it will be appreciated that those components and/or their functions may be implemented in software where appropriate and vice versa.

The invention also includes video signal processing apparatus including apparatus as described herein or operating in accordance with the described methods.

It will be understood by those skilled in the art that various modifications may be made to the apparatus and methods described herein without departing from the scope of the invention. The scope of the invention being limited only by the accompanying claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means can be embodied by one and the same item of hardware. The mere fact that certain measures are recited in mutually different dependent claims does not indicate that a combination of these measures cannot be used to advantage.

What is claimed is:

1. A method for detecting asymmetry in transient signals, the method comprising the steps:
    asymmetrically filtering an input signal to detect pre-shoots and after-shoots of transient input signals; and
    comparing amounts of pre-shoots and after-shoots to furnish an output signal indicating whether pre-shoots or after-shoots predominate,
wherein the step of asymmetrically filtering comprises the sub-steps:
    filtering the input signals utilizing a first set of filter coefficients resulting in an impulse response arranged to provide a first output representing only the pre-shoots present in the input transient signals; and
    filtering the input signals utilizing a second set of filter coefficients resulting in an impulse response arranged to provide a second output representing only the after-shoots present in the input transient signals.

2. The method as claimed in claim 1, wherein said first set of filter coefficients are anti-symmetrical to said second set of filter coefficients.

3. The method as claimed in claim 1, wherein the step of asymmetrically filtering further comprises the sub-step:
    calculating absolute values of the first and second outputs to give first and second absolute values, respectively.

4. The method as claimed in claim 3, wherein the step of asymmetrically filtering further comprises the sub-steps:
    summing the first absolute values over a predetermined time interval to obtain first summed values; and
    summing the second absolute values over the predetermined time interval to obtain second summed values.

5. The method as claimed in claim 4, wherein said predetermined time interval comprises an interval between field pulses of a video signal.

6. The method as claimed in claim 1, wherein the output signal provides a value measure of the relative amounts of pre-shoots and after-shoots present.

7. A method for detecting asymmetry in transient signals, the method comprising the steps:
    asymmetrically filtering an input signal to detect pre-shoots and after-shoots of transient input signals; and
    comparing amounts of pre-shoots and after-shoots to furnish an output signal indicating whether pre-shoots or after-shoots predominate,
wherein said method further comprises the step:
    averaging the output signal of the comparing step over a plurality of field periods to reduce field-to-field variation effects.

8. An apparatus for detecting asymmetry in transient signals of an input signal, the apparatus comprising:
    a pre-shoot filter for receiving and asymmetrically filtering an input signal utilizing a first set of filter coefficients to provide a first output in which substantially only pre-shoots of input transient signals are present;
    an after-shoot filter for receiving and asymmetrically filtering the input signal utilizing a second set of filter coefficients to provide a second output in which substantially only after-shoots of input transient signals are present; and
    summing and comparison means for summing the first outputs over a predetermined time interval, for summing the second outputs over the predetermined time interval, and for comparing first and second summed outputs to give an output signal indicating whether pre-shoots or after-shoots predominate over the predetermined time interval.

9. A peaking filter for performing peaking correction on the input signal, said peaking filter comprising an FIR filter comprising:
    a delay line for receiving the input signal and having a plurality of outputs;
    a plurality of multipliers each having a first input terminal connected to a respective one of the plurality of outputs of the delay line representing a multiplicand, and each having a second input terminal for receiving a respective filter coefficient representing a multiplier, said filter coefficients being variable, and each having an output terminal for outputting a respective product; and
    a summing circuit f or receiving and summing the respective products from the multipliers, and providing a summed output, wherein said peaking filter further comprises:
    means for receiving a detection signal indicating whether pre-shoots or after-shoots are found to systematically predominate in transients of the input signal; and
    means for varying the filter coefficients of the FIR filter in accordance with the detection signal to provide a corrected output in which transients are substantially symmetrical, wherein said varying means varies said filter coefficients such that, if neither pre-shoots nor after-shoots are found, by said detection signal receiving means, to predominate in transients of the input signal, said filter coefficients are determined purely based upon a desired amount of peaking, and an impulse response of the filter will be symmetrical, whereas if said detection signal receiving means determines that pre-shoots are predominate, said varying means then varies said filter coefficients so as to provide an asymmetrical impulse response resulting in additional after-shoots being produced, and if said detection signal receiving means determines that after-shoots are predominate, said varying means then varies said coefficients so as to provide an asymmetrical impulse response resulting additional pre-shoots being produced.

* * * * *